United States Patent Office 3,216,782
Patented Nov. 9, 1965

3,216,782
PROCESS FOR SELECTIVELY REMOVING CARBON MONOXIDE FROM HYDROGEN-CONTAINING GASES
Johann G. E. Cohn, West Orange, N.J., assignor to Engelhard Industries, Inc., Newark, N.J., a corporation of Delaware
No Drawing. Filed Oct. 9, 1962, Ser. No. 229,471
3 Claims. (Cl. 23—2)

This application is a continuation-in-part of my application Serial Number 623,793, filed November 23, 1956, now abandoned.

This invention relates to the preferential oxidation of carbon monoxide in admixture with a hydrogen-containing gas.

There is considerable literature on the subject of selectively reacting carbon monoxide with oxygen in the presence of quantities of hydrogen much larger than the quantity of carbon monoxide present. By such reaction, carbon monoxide is converted into carbon dioxide which can be easily removed from the hydrogen-containing reaction effluent by scrubbing with a caustic or monoethanolamine absorbent. Such reactions are usually non-selective, i.e. result in the concurrent reaction of considerable amounts of hydrogen rather than the carbon monoxide impurity with the added oxygen and hence have not found commercial application. Hopcalite catalysts (containing CuO and Mn oxides) have been claimed to have some selectively for oxidation of carbon monoxide to carbon dioxide in the presence of hydrogen, but have not found practical application in part because of inactivation by the water also formed.

In contrast to the non-selective oxidation procedure hitherto known, the present invention provides a highly selective, low temperature process for the oxidation of carbon monoxide in hydrogen-containing gas to carbon dioxide. In accordance with the present invention, oxygen, in controlled amounts, is admixed with a hydrogen-containing gas containing carbon monoxide, and the gas mixture is passed over a rhodium or ruthenium catalyst at a temperature between about 120° C. and about 160° C. which results in the preferential oxidation of carbon monoxide to carbon dioxide with a simultaneous reaction of hydrogen and oxygen to form water. The formation of some water is unavoidable, due to the great reactivity of hydrogen and oxygen over the catalyst employed in the process of the invention, but the formation of water has no deleterious effect on the catalytic process. After the product gas is freed of carbon dioxide and water, a product gas stream essentially free of carbon monoxide impurity is obtained.

The catalyst used in the preferential oxidation steps is a metal selected from the group consisting of rhodium and ruthenium, preferably on a suitable support. Suitable catalyst supports include alumina, silica, kieselguhr, silica gel, diatomaceous earth, and the like.

Supported rhodium and ruthenium catalysts have heretofore been employed for the removal of CO and/or $CO_2$ from hydrogen-containing gas streams by contacting such gas streams with the catalyst at elevated temperatures, preferably above about 200° C. and even as high as 400° C. or higher. At such elevated temperature, CO and $CO_2$ removal is effected by reaction of hydrogen with the impurity to form methane and water.

At lower temperatures, e.g. in the range of 120° to 160° C. employed in the present process, it has been found that the CO present in CO—$H_2$ gaseous mixtures will preferentially react with oxygen added to the gaseous mixture to form $CO_2$, rather than with hydrogen to form methane, when such an admixture is contacted with a rhodium or ruthenium catalyst. At these temperatures, the methanation of $CO_2$ occurs with more difficulty, and the elimination of $CO_2$ from the reaction effluent is preferably accomplished by adsorption or washing techniques. Additionally, removal of CO from such gas streams by selective oxidation offers the advantage of conserving hydrogen since the only hydrogen lost is that which reacts with excess oxygen introduced into the gas mixture, as more fully described.

For optimum conversion, the catalyst metal should be present in the range of about 0.01 to 5 percent by weight of the catalyst metal and support, preferably about 0.05 to 2 percent by weight of the catalyst metal and support. The support for the catalyst metal may be in the form of pellets, powder or granules, and preferably comprises alumina. The supported catalyst may be prepared in any suitable manner, i.e. by treating the carrier or support with a solution of a suitable metal compound, and then reducing the metal compound to metal.

The reaction pressure used for the process of this invention ranges from about atmospheric to about 400 p.s.i.g., preferably from atmospheric to 200 p.s.i.g.

The reaction temperature is in the range of about 120° C. to 160° C., and it is necessary that the oxygen be present in an excess over the stoichiometric quantity required for complete reaction with carbon monoxide. Thus, the primary reaction involved in the process of the invention is:

$$CO + \tfrac{1}{2}O_2 \rightarrow CO_2 \qquad (1)$$

and the stoichiometric quantity of oxygen required to react with the carbon monoxide is seen to be 0.5 mole per mole of carbon monoxide. The molar ratio of oxygen to carbon monoxide in the gas mixture should be above 0.5 mole of oxygen per mole of carbon monoxide, preferably 1 to 3 moles of oxygen per mole of carbon monoxide.

If it is sufficient for the purification process to remove most of the carbon monoxide but not to reduce it to a low level (which may be the case where a large amount of carbon monoxide is present), a lower molar ratio of oxygen may be added, for example, the stoichiometric amount for reaction with the carbon monoxide.

Since the reaction of one mol of carbon monoxide with oxygen requires only 0.5 mol of oxygen for stoichiometric reaction, an excess of up to 2.5 mol of oxygen remain for reaction with hydrogen when the $O_2/CO$ molar ratio employed is 3, and this excess oxygen will result in the consumption of 5 mols of hydrogen by reaction in accordance with the following equation:

$$H_2 + \tfrac{1}{2}O_2 \rightarrow H_2O \qquad (2)$$

Obviously, if the $O_2/CO$ molar ratio employed for effective removal of carbon monoxide is less than 3, lesser amounts of hydrogen will be consumed. It was found that a molar ratio of oxygen to carbon monoxide of 2 was usually sufficient for complete reaction, using the above catalysts, in the temperature range of 120° C. to 160° C., and since the reaction of one part of carbon monoxide with oxygen requires only 0.5 part of oxygen for stoichiometric reaction, an excess of 1.5 parts of oxygen remained for reaction with hydrogen, thereby consuming 3 parts of hydrogen. Under these conditions, therefore, a loss of 3 parts of hydrogen per part of carbon monoxide oxidized, is sustained.

It will further be obvious to those desiring to practice the invention that the undesired side reaction (2) places a restriction on the feedstock composition which can be effectively treated in accordance with the invention. Thus, the invention is of particular value in the treatment of gas mixtures containing a relatively high content of hydrogen compared to the CO content, for example gaseous mixtures containing 90% or more hydrogen and from 0.01 to about 5% CO. The CO content of such gas mixtures is readily reduced by the present invention to less than 15 parts per million, and the amount of hydrogen lost by reaction (2) is small.

It will be recognized, however, that the process of the invention can be employed to treat hydrogen and carbon monoxide containing gas mixtures containing relatively large amounts of carbon monoxide (based on hydrogen) e.g. up to 20 or 25% CO based on hydrogen by volume, provided that the total CO is not above 5% and that the excess oxygen (within the stated range) required to ensure removal of all of the CO does not effectively remove all of the hydrogen present in the gas mixture. Thus, the stoichiometry of reactions (1) and (2) indicates that if an $O_2/CO$ molar ratio of 3:1 is used, all of the hydrogen in gaseous mixtures containing up to 16% CO (based on $H_2$) will be consumed; at $O_2/CO$ molar ratios of 2:1 all of the hydrogen in a mixture containing hydrogen and carbon monoxide in a molar ratio of 3:1 will be converted to water. It is clear, therefore, that the amount of hydrogen in feedstock which can be successfully treated by the process of the invention, and still provide a useful hydrogen-containing gas, must be greater than that which will react with the excess oxygen present, i.e. with any oxygen in excess of that consumed by reaction with carbon monoxide.

The carbon monoxide content of the gas mixture treated by the process of the invention is generally low, e.g. between about 0.01 and about 5%, commonly 0.01 to 2%. If the gas contains more than 1% CO, the addition of sufficient oxygen to remove all of the CO contained in the feed may result in excessively high temperatures due to the exothermic nature of the reaction, and loss of selectivity will occur unless the reaction temperature is maintained within the described range. Accordingly, with a CO content of 1% or more, where removal of CO to very low levels is desired, it is preferred to add less than the amount of oxygen required to completely eliminate the CO at one time so that two or more steps of partial oxidation take place successively.

The space velocity of the gas may be in the range of 500 to 100,000 standard volumes of gas per volume of catalyst per hour, preferably 1000 to 20,000 on a volume basis, these space velocities being measured at 70° F. and at atmospheric pressure.

For the selective oxidation method, laboratory and pilot plant results showed that below a certain temperature, complete reaction of oxygen does not occur, and above a certain temperature, carbon monoxide and/or carbon dioxide reaction with hydrogen occurs, resulting in methane formation rather than $CO_2$ formation. Selective oxidation of CO is therefore possible only within the designated temperature range of about 120° C. to about 160° C. Removal of formed $CO_2$ by scrubbing is advantageous, particularly in the case of purifying ammonia synthesis gas, since methanation would result in build up of methane which could only be avoided by partial venting of gases with attendant loss of $H_2$ and $N_2$.

The process of the present invention is useful in providing pure hydrogen, or hydrogen-containing streams free of carbon monoxide which is a potent poison in many catalytic reactions employing hydrogen as a reactant. Carbon monoxide can be effectively removed by the process described herein from low cost hydrogen streams, for example, from hydrocarbon reforming processes, producer gas or water gas which may first be treated for removal of sulfur impurities. The selective oxidation process is especially effective for removal of carbon monoxide from hydrogen-containing streams used in ammonia synthesis, which require removal of carbon monoxide to levels as low as 10 to 20 p.p.m., or preferably even lower levels. Such streams ordinarily contain from about 20 to about 80% hydrogen, nitrogen in an amount calculated to provide an $H_2-N_2$ molar ratio of about 3:1 and other inert gases such as $CO_2$, $CH_4$, water, etc.

Concentrations of carbon monoxide in the range of 0.01 to 2 percent by volume were added either to pure hydrogen or to a mixture consisting of 3 percent by volume of hydrogen and 97 percent by volume of nitrogen. To a given mixture at a given temperature, varying quantities of oxygen were added and the resulting gas mixtures were passed over the catalyst under the conditions indicated, the carbon monoxide content of the various effluents being continuously monitored. When the oxygen-carbon monoxide ratio reaches a certain value, no carbon monoxide (limit of detectability 15 p.p.m.) was found to be present in the effluent. This oxygen-carbon monoxide concentration ratio was established for various temperatures, and it was found that a ratio below about 3:1 was sufficient for all of the cases tested.

In general, it was found that oxidation over the ruthenium catalyst was more selective than oxidation over the rhodium catalyst, and that an oxygen-carbon monoxide concentration ratio of about 2:1 was sufficient to remove CO to below the detectable limit.

EXAMPLE I

A series of runs was made to determine the minimum oxygen to carbon monoxide molar ratio for use with a catalyst consisting of 0.5% rhodium on ⅛" alumina pellets at various space velocities. Operation was generally within the temperature range of 130° C. to 160° C. and at a pressure slightly over atmospheric. The gas used was pure hydrogen, and the results were as follows:

*Table I*

| Run No. | Kg. catalyst per 100 C.F.H. | Percent CO | $O_2/CO$ |
|---|---|---|---|
| 1 | 0.189 | 0.001 | 1.76 |
| 2 | 0.189 | 0.023 | 1.86 |
| 3 | 0.189 | 0.079 | 1.33 |
| 4 | 0.189 | 0.198 | 1.72 |
| 5 | 0.342 | 0.055 | 2.88 |
| 6 | 0.342 | 0.198 | 1.77 |
| 7 | 0.342 | 0.370 | 1.82 |
| 8 | 0.342 | 0.560 | 2.33 |

EXAMPLE II

A series of runs was made to determine the minimum oxygen to carbon monoxide molar ratio at various ruthenium on alumina catalyst concentrations and at various space velocities. The alumina was in the form of ⅛" pellets, and in Runs 1 to 4, the gas used was a mixture of 3 percent hydrogen and 97 percent nitrogen, while in Runs 5 to 8, the gas used was pure hydrogen. Temperature and pressure conditions were the same as in Example I. The results were as follows:

*Table II*

| Run No. | Percent Ru | Kg. Catalyst Per 100 C.F.H. | Percent CO | $O_2/CO$ |
|---|---|---|---|---|
| 1 | 0.1 | 1.51 | 0.21 | 0.9 |
| 2 | 0.1 | 1.51 | 0.43 | 1.28 |
| 3 | 0.1 | 1.51 | 0.865 | 1.19 |
| 4 | 0.1 | 1.51 | 1.66 | 1.24 |
| 5 | 0.5 | 0.342 | 0.055 | 0.56 |
| 6 | 0.5 | 0.342 | 0.125 | 0.64 |
| 7 | 0.5 | 0.342 | 0.343 | 1.49 |
| 8 | 0.5 | 0.342 | 0.620 | 1.94 |

It will be obvious to those skilled in the art that many modifications can be made within the scope of the present invention without departing from the spirit thereof, and the invention includes all such modifications.

What is claimed is:

1. A process for the selective oxidation of carbon monoxide to carbon dioxide in a gaseous mixture consisting essentially of from about 20 to about 98% by volume hydrogen, from 0.01 to 2% carbon monoxide and the remainder nitrogen which comprises contacting said gaseous mixture in the presence of oxygen with a supported metal catalyst selected from the group consisting of rhodium and ruthenium at a temperature in the range of about 120° C. to about 160° C., the amount of oxygen being sufficient to provide an oxygen to carbon monoxide molar ratio in the range of 1:1 to 3:1.

2. Process of claim 1 wherein the catalyst is rhodium on alumina.

3. Process of claim 1 wherein the catalyst is ruthenium on alumina.

References Cited by the Examiner

UNITED STATES PATENTS

| 3,024,593 | 3/62 | Houdry | 23—2.2 |
| 3,088,919 | 5/63 | Brown et al. | 23—2.1 X |

FOREIGN PATENTS

| 555,592 | 8/43 | Great Britain. |

MAURICE A. BRINDISI, *Primary Examiner.*